(12) United States Patent
Kagi et al.

(10) Patent No.: US 7,797,699 B2
(45) Date of Patent: Sep. 14, 2010

(54) METHOD AND APPARATUS FOR SCHEDULING VIRTUAL MACHINE ACCESS TO SHARED RESOURCES

(75) Inventors: Alain Kagi, Portland, OR (US); Andrew V. Anderson, Hillsboro, OR (US); Steven M. Bennett, Hillsboro, OR (US); Erik C. Cota-Robles, Portland, OR (US); Gregory M. Jablonski, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 1663 days.

(21) Appl. No.: 10/947,902

(22) Filed: Sep. 23, 2004

(65) Prior Publication Data

US 2006/0064697 A1    Mar. 23, 2006

(51) Int. Cl.
*G06F 9/455* (2006.01)
*G06F 9/46* (2006.01)
*G06F 3/00* (2006.01)

(52) U.S. Cl. .......................... 718/1; 718/103; 718/104; 710/5; 710/6; 710/39; 710/40

(58) Field of Classification Search ................ 718/103, 718/1, 104; 710/4–7, 5–6, 39–40; 711/100, 711/111
See application file for complete search history.

(56) References Cited

U.S. PATENT DOCUMENTS

| | | | | |
|---|---|---|---|---|
| 5,361,375 A * | 11/1994 | Ogi | ............................... | 718/1 |
| 5,386,561 A * | 1/1995 | Huynh et al. | ............... | 718/103 |
| 5,784,647 A * | 7/1998 | Sugimoto | ..................... | 710/39 |
| 6,157,963 A * | 12/2000 | Courtright et al. | ............. | 710/5 |
| 6,247,061 B1 * | 6/2001 | Douceur et al. | ............. | 709/240 |
| 6,658,485 B1 * | 12/2003 | Baber et al. | ................. | 719/314 |
| 6,804,758 B2 * | 10/2004 | Liao et al. | .................... | 711/169 |
| 6,813,766 B2 * | 11/2004 | Hay | .............................. | 718/1 |
| 7,131,120 B2 * | 10/2006 | Veselov | ...................... | 717/164 |
| 7,155,558 B1 * | 12/2006 | Vaghani et al. | ................ | 711/4 |
| 7,251,815 B2 * | 7/2007 | Donovan et al. | ............ | 718/105 |
| 7,340,742 B2 * | 3/2008 | Tabuchi | ...................... | 718/103 |
| 7,382,793 B1 * | 6/2008 | Sindhu et al. | ............... | 370/412 |
| 2002/0120663 A1 * | 8/2002 | Binns | ......................... | 709/103 |
| 2003/0009505 A1 * | 1/2003 | Cuomo et al. | ............... | 709/103 |
| 2003/0037091 A1 * | 2/2003 | Nishimura et al. | .......... | 709/103 |
| 2003/0140175 A1 * | 7/2003 | Bonar et al. | ................. | 709/314 |
| 2003/0172104 A1 * | 9/2003 | Hooman et al. | ............. | 709/103 |
| 2003/0208521 A1 * | 11/2003 | Brenner et al. | ............. | 709/103 |
| 2004/0034856 A1 * | 2/2004 | Boudnik et al. | ............. | 718/103 |
| 2006/0095659 A1 * | 5/2006 | New et al. | .................... | 711/112 |

* cited by examiner

*Primary Examiner*—Meng-Ai An
*Assistant Examiner*—Jennifer N To
(74) *Attorney, Agent, or Firm*—L. Cho

(57) ABSTRACT

A method for managing IO requests from a virtual machine to access IO resources on a physical machine includes determining a request priority associated with an IO request. The IO request is placed in an appropriate queue in response to determining the request priority.

19 Claims, 6 Drawing Sheets

METHOD AND APPARATUS FOR SCHEDULING VIRTUAL MACHINE ACCESS TO SHARED RESOURCES

FIELD

An embodiment of the present invention relates to virtualization. More specifically, an embodiment of the present invention relates to a method and apparatus for scheduling virtual machine (VM) access to input/output (IO) resources.

BACKGROUND

A conventional virtual machine manager (VMM) may run on a computer to present the abstraction of one or more VMs to other software. Each VM may function as a self-contained platform that runs its own software stack, including an operating system (OS) and applications, collectively this software stack is referred to as "guest software." Guest software running on a VM expects to operate as if it were running on a dedicated computer. For example, the guest software expects to control various computer operations and have access to physical (i.e., hardware) resources during these operations. The physical resources may include processor-resident resources, such as control registers, resources that reside in memory, such as descriptor tables, and devices on the hosting hardware platform, such as IO devices. In a VM environment, the VMM has ultimate control over the hardware resources. In order to provide protection from and between VMs, the VMM typically intercepts and arbitrates all accesses to the hardware resources made by the guest software.

When a plurality of VMs attempts to access an IO resource, the plurality of VMs must compete for the IO resource, with the VMM arbitrating the accesses to the resource. In the past, VMMs granted access to a shared resource without regard to the latency requirements of the guest software. This approach effectively failed to schedule requests to access IO resources based upon the requirements of the guest software. For example, guest software having no quality of service requirement may be granted access to an IO resource ahead of guest software having a high quality of service requirement because of the timing of the requests made. In some instances, the result of this scheduling would cause guest software to fail to meet its timing requirements and would adversely affect its performance.

Thus, what is needed is an efficient and effective method and apparatus for scheduling VM access to IO resources.

DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
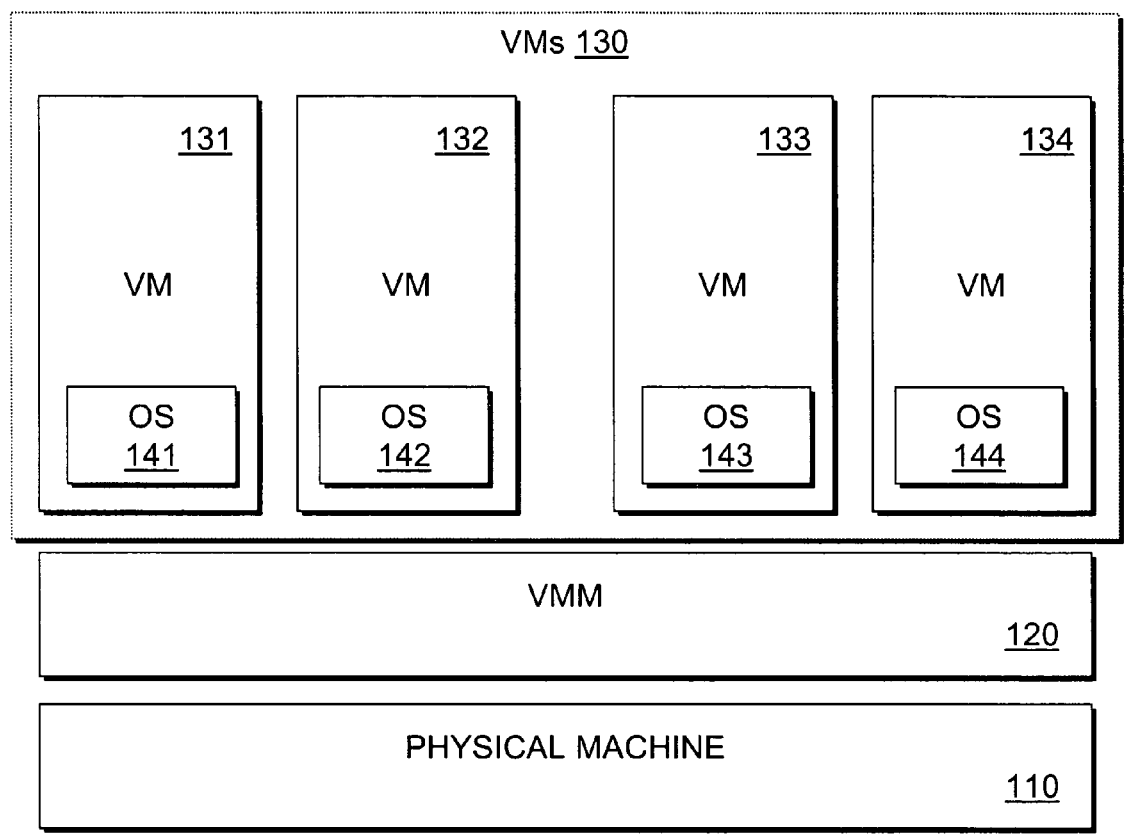
FIG. 1 is a block diagram that illustrates components of a system in which an embodiment of the invention resides.

FIG. 1 is a block diagram that illustrates components of a system 100 in which an embodiment of the invention resides. The system includes a physical machine 110. According to one embodiment, the physical machine 110 may be components of a computer system. The computer system may include, for example, one or more processors, a memory, buses, and various IO devices.

Figure 2:
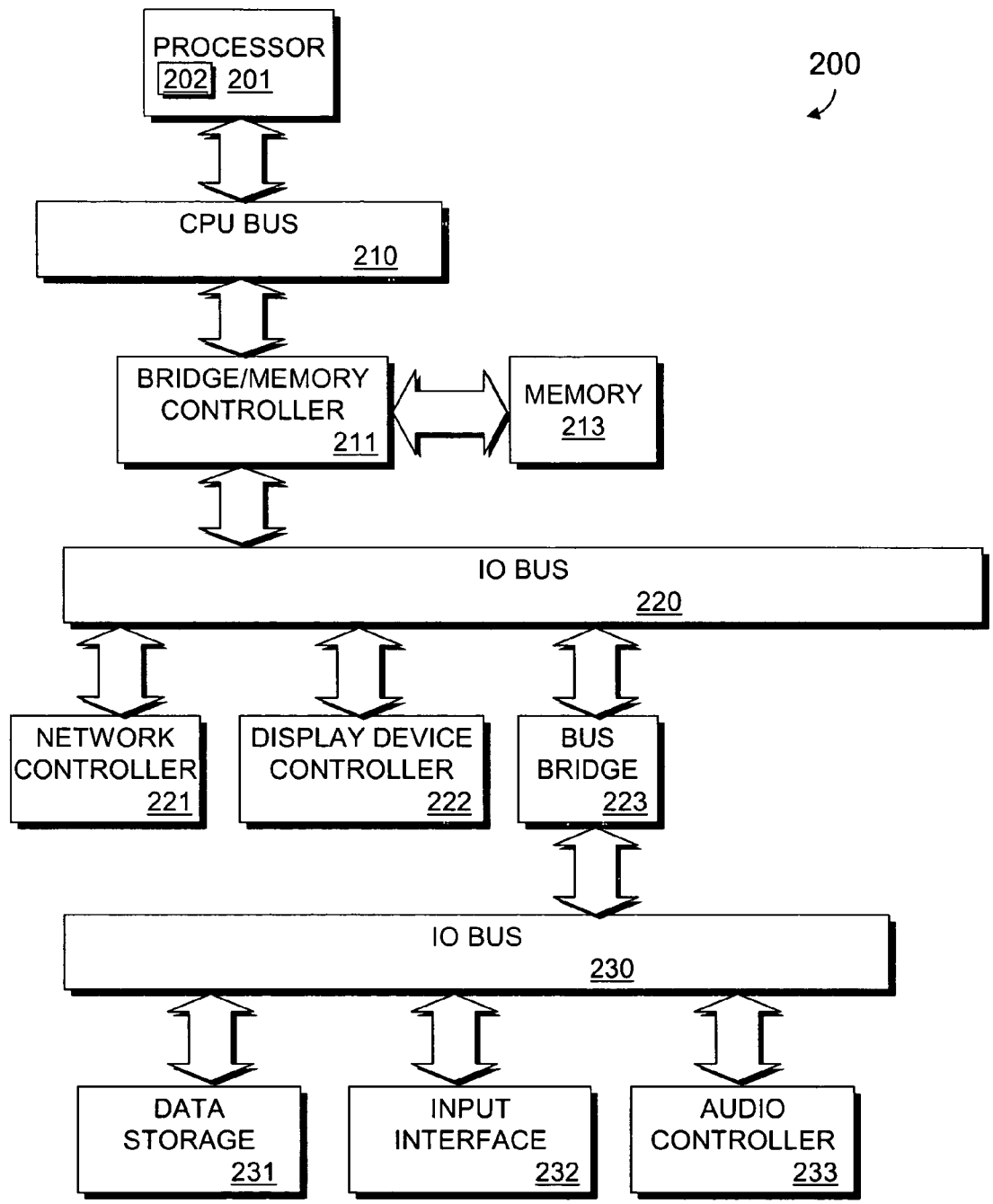
FIG. 2 illustrates an embodiment of the physical machine according to an embodiment of the present invention.

FIG. 2 is a block diagram of an exemplary computer system 200 according to an embodiment of the present invention. The computer system 200 may be used to implement the physical machine 110 shown in FIG. 1. The computer system 200 includes a processor 201 that processes data signals. The processor 201 may be a complex instruction set computer microprocessor, a reduced instruction set computing microprocessor, a very long instruction word microprocessor, a processor implementing a combination of instruction sets, or other processor device. FIG. 2 shows the computer system 200 with a single processor. However, it is understood that the computer system 200 may operate with multiple processors. Additionally, each of the one or more processors may support one or more hardware threads. The processor 201 is coupled to a CPU bus 210 that transmits data signals between processor 201 and other components in the computer system 200.

The computer system 200 includes a memory 213. The memory 213 may be a dynamic random access memory device, a static random access memory device, read-only memory, and/or other memory device. The memory 213 may store instructions and code represented by data signals that may be executed by the processor 201. A cache memory 202 may reside inside processor 201 that stores data signals stored in memory 213. The cache 202 speeds access to memory by the processor 201 by taking advantage of its locality of access. In an alternate embodiment of the computer system 200, the cache 202 resides external to the processor 201. A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first IO bus 220.

The first IO bus 220 may be a single bus or a combination of multiple buses. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 100.

A second IO bus 230 may be a single bus or a combination of multiple buses. The second IO bus 230 provides communication links between components in the computer system 200. A data storage device 231 is coupled to the second IO bus 230. The data storage device 231 may be a hard disk drive, a floppy disk drive, a CD-ROM device, a flash memory device or other mass storage device. An input interface 232 is coupled to the second IO bus 230. The input interface 232 may be, for example, a keyboard and/or mouse controller or other input interface. The input interface 232 may be a dedicated device or can reside in another device such as a bus controller or other controller. The input interface 232 allows coupling of an input device to the computer system 200 and transmits data signals from an input device to the computer system 200. An audio controller 233 is coupled to the second IO bus 230. The audio controller 233 operates to coordinate the recording and playing of sounds and is also coupled to the IO bus 230. A bus bridge 223 couples the first IO bus 220 to the second IO bus 230. The bus bridge 223 operates to buffer and bridge data signals between the first IO bus 220 and the second IO bus 230.

It should be appreciated that computer systems having a different architecture may also be used to implement the physical machine 110. For example, in an embodiment, the display device controller 222 may be attached to a different IO bus. In another embodiment, the memory controller 211 may be integrated onto the processor 201.

Referring back to FIG. 1, the system 100 includes a virtual machine monitor (VMM) 120. The VMM 120 is a layer that interfaces the physical machine 110 and that facilitates one or more virtual machines (VMs) 130 to be run. According to an embodiment of the present invention, the VMM 120 may be a sequence of instructions stored in a memory such as memory 213 shown in FIG. 2. The VMM 120 manages and mediates computer system resources in the physical machine 110 between the VMs 130 and allows the isolation of or data sharing between VMs 130. The VMM 120 achieves this isolation or sharing by virtualizing resources in the physical machine 110 and exporting a virtual hardware interface (i.e., a VM) that could reflect an underlying architecture of the physical machine 110, a variant of the physical machine, or an entirely different physical machine.

The system 100 includes one or more VMs 131-134 (collectively shown as 130). According to an embodiment of the present invention, a VM may be described as an isolated model of a machine including, but not limited to, a replica of the physical machine, a subset of the physical machine, or model of an entirely different machine. The VM may include the resources of the computer system in the physical machine 110, a subset of the resources of the computer system in the physical machine 110, or entirely virtual resources not found in the physical machine.

According to an embodiment of the present invention, the VMM 120 has control of the physical machine 110 and creates VMs 130, each of which behaves like a physical machine that can run its own operating system (OS). VMs 131-134 may run operating systems 141-144 respectively where the operating systems 141-144 may be unique to one another. To maximize performance, the VMM 120 allows a VM to execute directly on the resources of the computer system in the physical machine 110 when possible. The VMM 120 takes control, however, whenever a VM attempts to perform an operation that may affect the operation of other VMs, the VMM 120 or of the operation of resources in the physical machine 110. The VMM 120 emulates the operation and may return control to the VM when the operation is completed.

In virtualizing IO devices, the VMM 120 intercepts IO instructions issued by an operating system on a VM. The IO instructions may be, for example, IN and OUT instructions (i.e., accessing an IO device through an IO port) or memory accesses to memory-mapped IO devices. The IO instructions are trapped and emulated by the VMM 120. IO instructions are typically used to configure and activate IO devices by passing data to the IO device as part of the IO instruction. The VMM 120 may emulate the IO instructions, for example when data passed to the IO device by the IO instructions includes addresses that are not valid outside the VM because of the effect of the virtualization of physical memory by the VMM 120. The VMM 120 may also emulate the IO instructions to ensure security and correctness by allowing only one entity to have direct access to a given IO device in order to avoid conflicting usage of the device. The term "IO device," as used herein, may refer to a physical device in the physical machine 110, or to a model of a physical device implemented in the VMM 120. These software-based device models are referred to as virtual devices.

An IO instruction accessing an IO device is considered a virtualization event since it is required to be emulated by the VMM 120. A virtualization event requires storing the state of the guest software for a current VM and transitioning control to the VMM 120. The VMM 120 manages the virtualization event and may return control to the VM. As part of returning control to the VM, the state of the guest software is reloaded and control is returned to the guest software.

According to an embodiment of the present invention, the VMM 120 manages requests from VM 130 to access a shared resource on the physical machine 110, such as an IO device. The VMM 120 determines how the request to access the shared resource should be prioritized relative to other outstanding requests to access the resource. The request is placed in an appropriate queue in response to determining the prioritization of the request. Requests are executed (e.g., dispatched to the IO device) by the VMM 120 in an order that is dependent on which queue they are stored on and the position in the queue in which they are stored.

Figure 3:
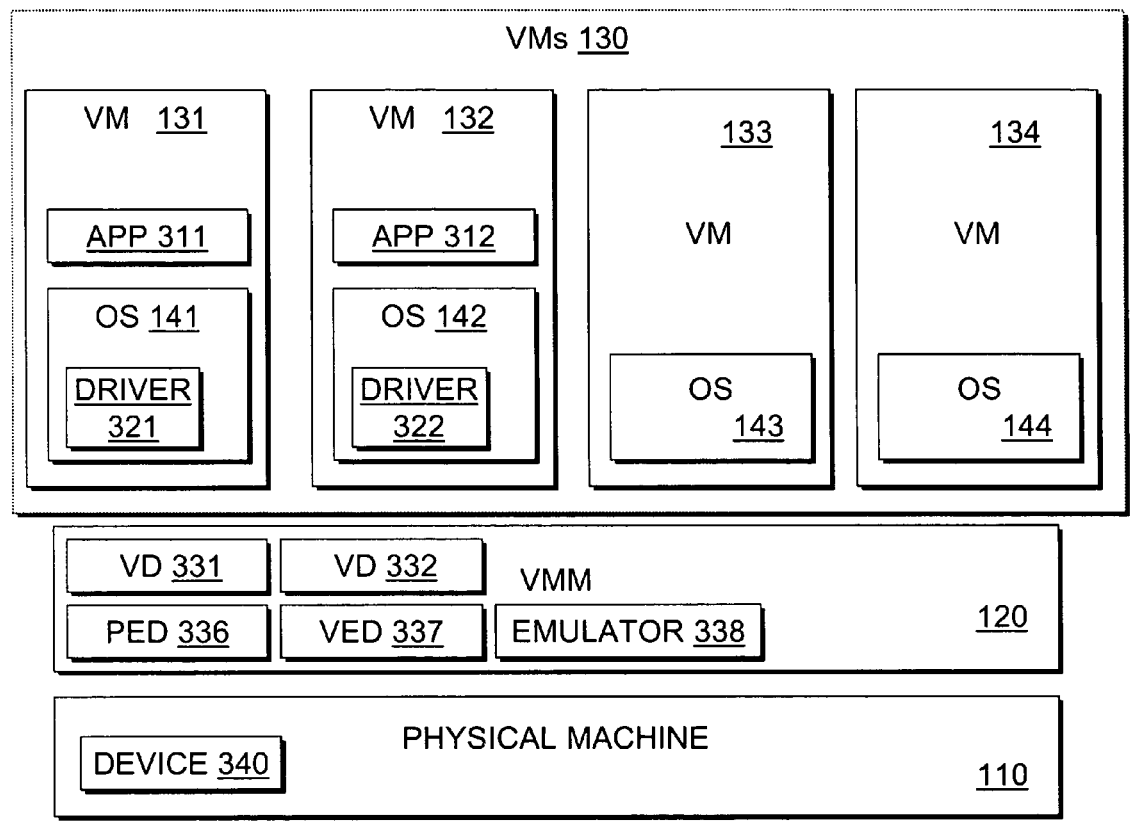
FIG. 3 is a block diagram that illustrates sub-components residing in the components of the system according to an embodiment of the invention.

FIG. 3 is a block diagram that illustrates sub-components residing in components of a system according to an embodiment of the invention. The system 300 includes components similar to the components in the system 100 illustrated in FIG. 1. A first application (APP) 311 running on a first VM 131 may include instructions in its instruction stream to access physical device (DEVICE) 340 in the physical machine 110. A second application 312 running on a second VM 132 may include instructions in its instruction stream to access physical device 340 in the physical machine 110. A device driver (DRIVER) 321 running in a first operating system 141 of the first VM 131 communicates with a first virtual device (VD) 331 in the VMM 120 via a virtualization event dispatcher (VED) 337. A device driver 322 running in a second operating system 142 of the second VM 132 communicates with a second virtual device 332 in the VMM via the virtualization event dispatcher 337.

The virtual devices 331 and 332 virtualize the functionalities of the physical device 340 for each of the VMs 131 and 132. The virtual devices 331 and 332 facilitate correct emulation of the physical device 340 to the device drivers 321 and 322 utilizing emulator 338. Together with emulator 338, a physical event dispatcher (PED) 336 coordinates access to the physical device 340 when necessary. The physical device 340 may be, for example, a shared resource such as an IO device. In one embodiment, the physical device 340 may be a data storage device such as a hard disk, a communication device such as a network controller, an input device such as an audio interface or a keyboard, an output device such as an audio or tactile response device, a display device such as a video card or other device.

According to an embodiment of the VMM 120, the virtual device 331 may emulate a device quite different than the physical device 340. For instance, the virtual device may implement one interface (e.g., EIDE) and the physical device may implement a different interface (e.g., SCSI). Also the device classes not need match. An embodiment of this invention may implement, for instance, a virtual storage device using remote storage accessible through a physical network device.

According to an embodiment of the VMM 120, the virtual event dispatcher 337 routes the virtualization events generated by the execution of the VMs 130 to the proper virtual device 331 or 332. The communication between the device drivers 321 and 322 and the virtualization event dispatcher 337 may be through the execution of IO instructions, which are trapped to the VMM 120. In an embodiment, multiple IO instructions may be required to initiate action from a device. For example, to read data from a storage device, a number of IO instructions may be used to indicate to the device the storage location of the data requested, the size of the data requested, the location in memory to store the data read from the storage, etc. Configuration data is followed by an IO instruction which triggers the actual read of the data from the device. For some IO devices and some actions, only a single IO instruction is required. Collectively, any such sequence of one or more IO instructions specifying an action to be taken by the IO device is referred to as an IO request, or simply as a request.

According to an embodiment of the VMM 120, the physical event dispatcher 336 determines an order in which the VMs 131 and 132 access the physical device 340 through the virtual devices 331 and 332. The physical event dispatcher 336 stores an IO request into one or more pending request queues (or simply queues). In one embodiment of the invention, requests to access the physical device 340 through the virtual devices 331 and 332 are combined with requests to access the physical device 340 from the VMM. VMM requests to access the physical device 340 may include prioritization information based on VMM state or transaction type.

According to an embodiment of the present invention, there are two pending request queues, a preferred queue and a non-preferred queue. The physical event dispatcher 336 may determine which queue to store an IO request based upon a status given to a VM originating the IO request. For example, one VM may be designated as the preferred VM, while all others are designated as non-preferred VMs. The designation of a preferred VM may apply to IO requests to access some or all of the IO devices made available to the VM. Different VMs may be designated as "preferred" with regard to IO requests to access different IO devices.

The physical event dispatcher 336 may also determine which queue to store an IO request based upon a status of the IO request as indicated by software on the VM originating the IO request. In this embodiment, the software (such as operating system 141 or 142) would determine when an application has a quality of service requirement and communicate this information to the physical event dispatcher 336. For example, an application with a quality of service requirement may be a hard real-time application (e.g., device controller in an industrial application), a soft real-time application (e.g., a video decoder), an interactive application (e.g., interacting with the user through human interface devices), etc.

It should be appreciated that a quality of service requirement may be assigned to a VM based on the nature of the devices which have been assigned to the VM (e.g., a TV capture card, an audio card, etc.). A quality of service requirements may be associated with the VM as part of a static or dynamic VMM configuration process. Quality of service characteristics may also be assigned to one or more devices rather than to the VM which owns them. In one embodiment an API is established through which guest software running on a VM may specify the performance levels required by the guest software or a device which the VM owns. A quality of service status may also be assigned based on reference stream characteristics. These quality of service requirements may be used to determine a priority for an IO request.

It should be appreciated that a priority may be assigned to a VM according to an activity state. VMs which are booting, shutting down, or involved with maintenance tasks may be assigned low priorities and potentially provided access to underlying devices only when the devices would otherwise be idle. Such a status-based priority may change dynamically.

Quality of service requirements (e.g., pertaining to a device, a VM or an application) may include specific throughput levels, priority levels relative to other requests, etc. The VMM may provide specified quality of service in support of contractual agreements (e.g., to support a computing commodity market in which VMs with certain characteristics are sold by capacity).

According to an embodiment of the present invention, the physical event dispatcher 336 may determine which queue to store an IO request based upon a tag issued with the IO request specifying a priority associated with the IO request. In this embodiment, a device driver (such as device driver 321 or 322), other software associated with an application having a quality of service requirement or the virtual machine monitor would generate a tag that indicates the priority of the IO request. It should be appreciated that other techniques and procedures may be used by the physical event dispatcher 336 to determine which queue to store an IO request. In an embodiment which includes preferred and non-preferred request queues, the tag may indicate if the IO request should be given preference, and hence placed in the preferred request queue.

The physical event dispatcher 336 determines the order in which IO requests from the request queues are serviced (i.e., executed). When the physical event dispatcher 336 selects an IO request for servicing, it may send the request to the associated IO device and manage any response returned from the device. For example, at the completion of processing the request, an IO device may generate an interrupt to inform the physical event dispatcher 336 that the request has been completed. The order in which pending IO requests are serviced from the pending request queues is referred to herein as the request scheduling policy. In an embodiment, IO requests in the preferred queue may be serviced before IO requests in the non-preferred queue. Further embodiments of the request scheduling policy are described below.

In an embodiment, the physical event dispatcher 336 may reorder the IO requests present in the pending request queues. For example, as the status of a device, VM or the VMM changes, the physical event dispatcher 336 may reprioritize IO requests within a given queue and may move IO requests from one queue to another. In an embodiment, IO requests may be removed from the pending request queues as part of this reordering. For example, speculative or maintenance IO requests from the virtual machine monitor or a VM which are no longer applicable may be removed.

Figure 4:
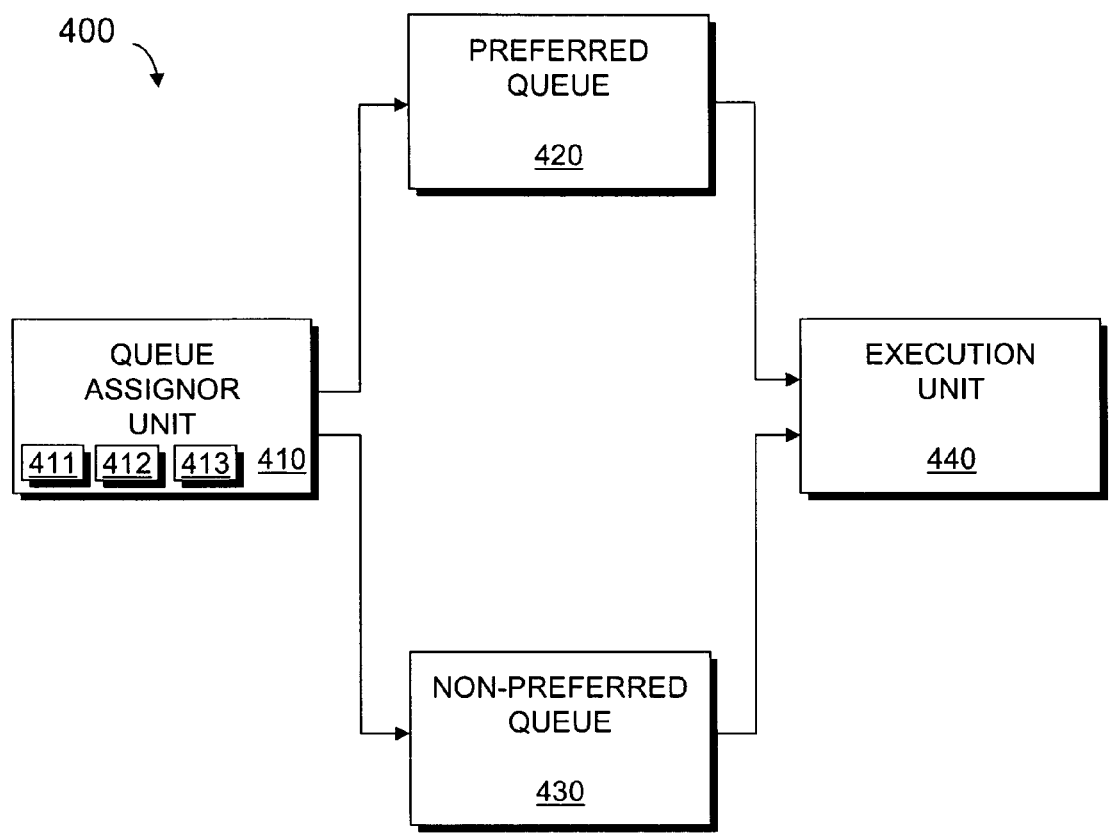
FIG. 4 illustrates components of a physical event dispatcher according to an embodiment of the present invention.

FIG. 4 illustrates a physical event dispatcher 400 according to an embodiment of the present invention. The physical event dispatcher 400 may be used to implement the physical event dispatcher 336 shown in FIG. 3. The physical event dispatcher 400 includes a queue assignor unit 410. The queue assignor unit 410 receives IO requests from virtual devices (such as virtual devices 331 and 332 in FIG. 3) and directly from VMs to access a shared resource. The queue assignor unit 410 places the IO request on an appropriate queue in response to determining the priority of the IO request. The priority of an IO request, (request priority herein) may be determined by a variety of mechanisms. In an embodiment, a request priority may be one of two values indicating if the IO request is "preferred" or "non-preferred." In another embodiment, the request priority may take on a wider range of values.

The queue assignor unit 410 may include a VM status unit 411 that identifies a VM making an IO request and determines the priority given to the IO request based on the identity of the VM issuing the IO request. For example, a particular VM may have been designated as a preferred VM and hence should be given preference and hence the priority assigned to IO requests from the preferred VM will be given higher priority. The VM may be designated as a preferred VM when it is created. An admission control protocol may be used during the creation of the VM to specify that the VM should be given preference when accessing a specified shared resource.

The queue assignor unit 410 may include a VM interface 412 that receives an indication from guest software issuing an IO request that a higher quality of service guarantee is required. The VM interface 412 may identify IO requests made from that VM as IO requests that should be assigned a higher priority until it receives an indication from the guest software that the higher quality of service requirement is no longer required.

The queue assignor unit 410 may include a tag identifier unit 413 that receives a tag issued with an IO request that indicates the requested priority of the IO request. IO requests with higher requested priority values may be assigned a higher request priority by the tag identifier unit 413. The tag identifier unit 413 may be used by the queue assignor unit 410 to determine which IO requests should be given preference and which IO requests should not be given preference.

The queue assignor unit 410 is shown with a VM status unit 411, a VM interface 412, and a tag identifier unit 413. It should be appreciated that the queue assignor unit 410 may implement one or more of these components and need not implement all of these components. In an embodiment where more than one of the components is included, the priority of the IO request may be determined by evaluating the information from each component according to some weighting function to arrive at a final request priority.

According to an embodiment of the invention, the physical event dispatcher 400 includes a preferred queue 420 and a non-preferred queue 430. IO requests to access a shared resource may be stored on either the preferred queue 420 or a non-preferred queue 430 by the queue assignor unit 410. IO requests that have a request priority over a preferred request threshold value are stored in the preferred queue 420, while others are stored in the non-preferred queue 430. In one embodiment, the request priority may take on any integer value between 0 and 100. Furthermore, the queue assignor unit 410 includes a VM status unit 411, VM interface unit 412 and tag identifier unit 413, each assigning a priority value to each request with the final request priority generated by averaging the three values. In an embodiment, the preferred request threshold value is assigned the value of 50. If the average of the three values from the three units is greater than 50, then the IO request is stored in the preferred queue 420. In an embodiment with more than two request queues, a set of request threshold values determine the queue to which an IO request is stored based on the request priority.

In one embodiment, the request priority may be determined by the status of the VM issuing the IO request, by the status of the application issuing the request or by the status of the device being accessed. For example, if the application is shutting down, the IO request may be assigned a relatively lower priority. In an embodiment, if it is determined that a device may transition to a lower power state, thereby increasing access times to the device, an IO request to the device may be given a relatively higher priority.

The status of a device, a VM, a VMM or an application may be determined through a variety of means. For example, the status may be defined statically. Alternatively, explicit communication with the device, VM or application, may indicate to the VMM the associated status. Alternatively the status may be determined by the VMM using dynamic analysis techniques. In an embodiment, the priority of a request to access a first IO device may be determined by the status of a second IO device.

The physical event dispatcher 400 includes an execution unit 440. The execution unit 440 processes IO requests to access a shared resource stored in the preferred queue 420 and the non-preferred queue 430. Whenever the shared resource is available, the execution unit 440 first checks to see whether an IO request is in the preferred queue 420. If an IO request is in the preferred queue 420, the execution unit 440 processes that IO request. If no IO requests are in the preferred queue 420, the execution unit 440 checks to see whether an IO request is in the non-preferred queue 430. If an IO request is in the preferred queue 420, the execution 440 processes that IO request. Only when the preferred queue 420 is empty does the execution unit 440 process an IO request in the non-preferred queue 430.

FIG. 4 illustrates an embodiment of the physical event dispatcher 400 where there are two queues, a preferred queue 420 and a non-preferred queue 430. It should be appreciated that the physical event dispatcher 400 may include any number of additional queues to allow scheduling of IO requests to a shared resource with a finer granularity. For example, a first queue may be designated as a high priority queue, a second queue may be designated as a middle priority queue, and a third queue may be designated as a low priority queue. In this embodiment, the queue assignor unit 410 may be configured to rate the priority of each IO request and determine which queue to assign an IO request based upon its priority rating. The execution unit 440 may be configured to process IO requests from the queues in a predetermined order based upon a priority rating designated for each queue.

According to an embodiment of the present invention, there are more than two such queues 420 and 430. In this embodiment, the physical event dispatcher 440 may choose IO requests to execute based on a priority assigned to individual queues, proceeding from the highest priority queue to the lowest priority. In one embodiment, the physical event dispatcher 440 does not execute an IO requests from a lower priority queue if there are IO requests in any higher priority queue.

Figure 5:
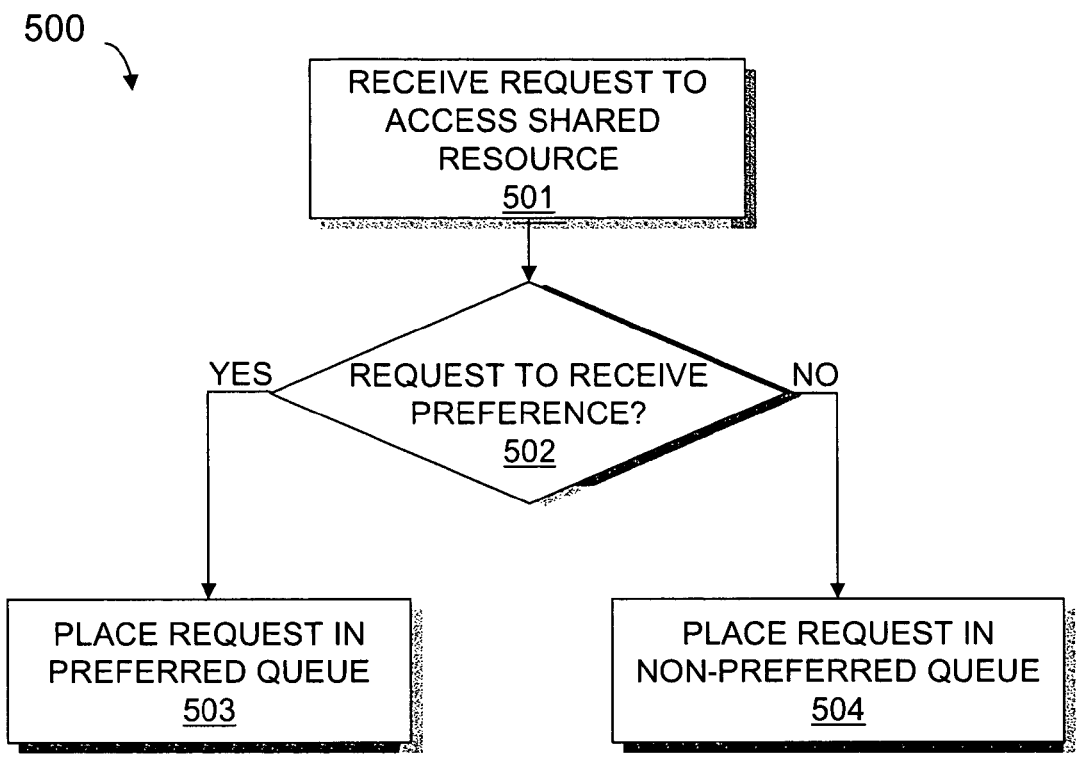
FIG. 5 is a flow chart of a method for queuing IO requests to access a shared resource from virtual machines according to an embodiment of the present invention.

FIG. 5 is a flow chart 500 of a method for queuing IO requests to access a shared resource from VMs according to an embodiment of the present invention. At 501, an IO request to access a resource is received from a VM.

At 502, the queue in which the IO request should be placed is determined. According to an embodiment of the present invention, determining whether the IO request should be given preference (and hence placed in the preferred queue) includes identifying a VM issuing the IO request, and determining whether the VM has been designated as a preferred VM. Designation of the VM as the preferred VM may be performed, for example, with an admission control protocol when the VM is created.

According to a second embodiment of the present invention, determining whether the IO request should be given preference (and hence placed in the preferred queue) includes identifying a VM issuing the IO request, and determining whether an operating system on a VM issuing the IO request has indicated that the IO request is made on behalf of an application with a quality of service requirement.

According to a third embodiment of the present invention, determining whether the IO request should be given preference comprises identifying a tag issued with the IO request that indicates that the IO request should be given preference. The tag may be generated by a device driver on the VM generating the IO request. According to an embodiment of the present invention, a priority assigned to a given transaction is inferred based on the currently active VM, or the currently active process within the VM.

If it is determined that the IO request should be given preference, control proceeds to 503. If it is determined that the IO request should not be given preference, control proceeds to 504. At 503, the IO request is placed in a queue of preferred pending IO requests. At 504, the IO request is placed in a queue of non-preferred pending IO requests.

Figure 6:
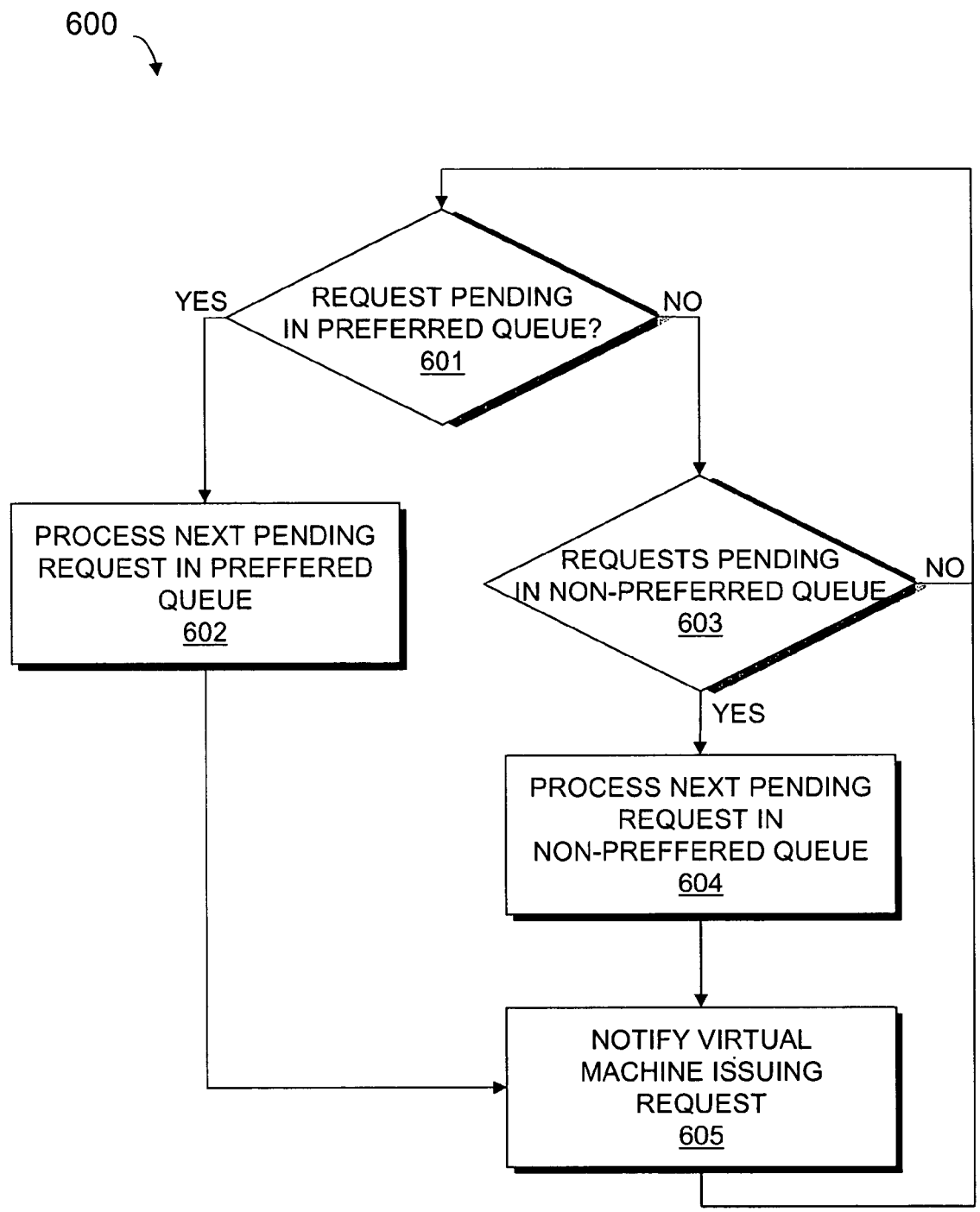
FIG. 6 is a flow chart of a method for de-queuing IO requests to access a shared resource from virtual machines according to an embodiment of the present invention.

FIG. 6 is a flow chart 600 of a method for de-queuing IO requests to access a shared resource from VMs according to an embodiment of the present invention. At 601, it is determined whether there are pending IO requests in a preferred queue. If there are pending IO requests in the preferred queue, control proceeds to 602. If there are no pending IO requests in the preferred queue, control proceeds to 603.

At 602, the next pending IO request in the preferred queue is selected for execution. For example, the IO request may be forwarded to the device on the physical platform or processed by a virtual device model in the VMM. Control proceeds to 605.

At 603, it is determined whether there are pending IO requests in a non-preferred queue. If there are pending IO requests in the non-preferred queue, control proceeds to 604. If there are no pending IO requests in the non-preferred queue, control returns to 601.

At 604, the next pending IO request in the non-preferred queue is executed. Control proceeds to 605.

At 605, the VM issuing the IO request is notified that the IO request has been satisfied. For example, in an embodiment, an interrupt may be delivered to the VM. Control returns to 601. It should be appreciated that there may be a significant delay between the execution of an IO request (e.g., the delivery of the IO request to an IO device) and the completion of the processing of the IO request. For example, an access to a disk drive may take many milliseconds to complete. During this delay, processing logic may deliver additional IO requests to the same or different IO devices, depending on the requirements and restrictions of the IO devices and the presence of appropriate pending IO requests. In an embodiment, multiple threads of execution may be utilized to enable concurrency in the presence of long IO processing delays.

FIGS. 5 and 6 are flow charts illustrating methods for queuing and de-queuing IO requests to access a shared resource from VMs according to embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

It should be appreciated that the queuing and scheduling mechanisms described with reference to FIGS. 4 and 5 are only exemplary embodiments of the present invention and that different queuing and scheduling mechanisms may also be implemented. For example, the execution unit 440 may also determine from which queue to process an IO request based on a proportional sharing algorithm, a round-robin scheduling policy, or an alternate scheme.

According to an embodiment of the present invention, a single virtual device may be backed by a set of physical devices. Dependency information based on the virtual device characteristics and virtual device usage may be utilized in IO request scheduling. IO request queuing, prioritization and scheduling may be dynamically adjusted to optimize performance for a given device or VM or to maximize the use of resources. For example, if an IO request to a first device is delayed (e.g., by inherent limitations or temporary congestion of a first device) then subsequent IO requests which are serialized with respect to the first IO request may be reduced in priority.

According to an embodiment of the present invention, scheduling decisions may be made based on access characteristics of the physical devices. For example, the elevator algorithm or other shortest seek time first algorithms may be employed to increase device utilization.

It should be appreciated that the VMM 120 (shown in FIG. 3) may maintain multiple copies of key data on multiple physical devices to mitigate risk in the case of device failure and increased performance. In one embodiment, this replication of data may be comprehended by the queuing and scheduling mechanisms to increase system performance by scheduling requests to access replicated data. In one embodiment data replication traffic is serviced opportunistically so that it does not impact foreground tasks.

According to an embodiment of the present invention, the scheduling algorithm gives precedence to accesses originating from a VM with interactive input.

Virtual devices may insert additional requests into the scheduling queues to prefetch data speculatively based on the stream of requests received from VMs or device characteristics. These prefetch requests may be ignored or opportunistically serviced by the physical event dispatcher. In one embodiment, the physical event dispatcher may monitor requests from each virtual device and speculatively prefetch data according to observed access patterns, and device characteristics. These prefetch requests may be removed from the pending request queues at a later time if it is determined that they are no longer beneficial or if higher priority requests would be displaced by their presence.

It should be appreciated that a VMM may employ a log structured file system to maintain device contents. Virtual devices may choose to buffer write data in memory rather than service IO requests (i.e., queue them for access to the physical device) in order. In one embodiment, there may be other classes of requests which are used to assess and maintain the health of the device (e.g., to perform defragmentation, device refresh, bad sector scans, etc.). Each of these classes of requests may have a priority assigned such that these requests are scheduled to occur only after IO requests in other classes have been serviced.

According to an embodiment of the present invention, prioritization and scheduling of device accesses may be based upon thermal conditions or power factors (e.g., recent device activity, remaining battery capacity).

Embodiments of the present invention may be provided as a computer program product, or software, that may include a machine-readable medium having stored thereon instructions. The machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The term "machine readable medium" used herein shall include any medium that is capable of storing or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for managing input/output (TO) requests on a system executing a virtual machine (VM), comprising:
    determining a request priority associated with an IO request from a VM based on a status of the VM designated by admission control protocol when the VM is created, whether the IO request is associated with a quality of service requirement, and whether a tag issued with the IO request indicates that the IO request should be given preference;
    placing the IO request from the VM in one of a plurality of pending request queues in response to determining the request priority; and
    processing an IO request in one of the pending request queues to allow access to an IO resource.

2. The method of claim 1, further comprising examining in a priority ordering the plurality of pending request queues to select an IO request for execution.

3. The method of claim 1, further comprising reordering TO requests present in the plurality of pending request queues.

4. The method of claim 1, wherein the plurality of pending request queues comprises a preferred queue and a non-preferred queue.

5. The method of claim 4 further comprising checking the preferred queue for IO requests to select for execution.

6. The method of claim 5 further comprising checking the non-preferred queue for IO requests to select for execution after checking the preferred queue.

7. The method of 6, further comprising executing an IO request in the non-preferred queue after IO requests in the preferred queue have been executed.

8. The method of claim 1, wherein determining the request priority is performed by a virtual machine monitor (VMM) executed on a computer system executing the VM.

9. An article of manufacture stored on a storage medium including sequences of instructions, the sequences of instructions including instructions which when executed causes a computer system to perform:
    having a virtual machine monitor (VMM) executed on the computer system determine a request priority associated with an IO request from a (virtual machine) VM executed on the computer system based on a status of the VM designated by an admission control protocol when the VM is created, whether the IO request is associated with a quality of service requirement, and whether a tag issued with the IO request indicates that the IO request should be given preference;
    placing the IO request from the VM in one of a plurality of pending request queues on the computer system in response to determining the request priority; and
    processing an IO request in one of the pending request queues to allow access to an IO resource on the computer system.

10. The article of manufacture of claim 9, further comprising instructions which when executed causes the machine to perform selecting an IO request from one of the plurality of pending request queues for execution.

11. The article of manufacture of claim 10, further comprising instructions which when executed causes the machine to perform examining in a priority ordering the plurality of pending request queues to select an IO request for execution.

12. The article of manufacture of claim 9, further comprising instructions which when executed causes the machine to perform reordering IO requests present in the plurality of pending request queues.

13. The article of manufacture of claim wherein the tag is generated by software on one of the virtual machine and a virtual machine monitor.

14. The article of manufacture of claim 9, wherein the IO request comprises an attempt to access one of a display device, an input device, an output device, a storage device and a communication device.

15. A computer system, comprising:
    a memory; and
    a processor to execute instructions in memory to implement a physical event dispatcher that includes a queue assignor unit to determine a request priority associated with an input/output (IO) request from a virtual machine (VM) executed on the processor to access an IO resource based on a status of the VM designated by an admission control protocol when the VM is created, whether the IO request is associated with a quality of service requirement and whether a tag issued with the request indicates that the IO request should be given preference;
    a plurality of pending requested queues with which to receive an IO request from the queue assignor unit; and
    an execution unit to process an IO quest in one of the plurality of pending request queues to allow access to the IO resource.

16. The computer system of claim 15, wherein the queue assignor unit comprises a virtual machine status unit to identify a status of a virtual machine making an IO request to determine a priority given to the IO request.

17. The computer system of claim 16, wherein the queue assignor unit comprises a tag identifier unit to identify a priority requested for an IO request.

18. The computer system of claim 15, wherein the queue assignor unit comprises a virtual machine interface to receive an indication from guest software that an IO request requires a high priority.

19. A method for managing input/output (IO) requests to access an IO resource on a computer system executing a virtual machine monitor (VMM) and a plurality of virtual machines (VMs), comprising:

having the VMM determine a request priority associated with an IO request from a VM executing on the computer system based on a status of a VM issuing the IO request where the status of the VM is designated by an admission control protocol when the VM is created, a status of the VMM, a status of the IO resource, a status of a second IO resource, and a status of an application executing in the VM issuing the IO request;

placing the IO request from the VM in one of a plurality of pending request queues on the computer system in response to determining the request priority; and processing an IO request in one of the pending request queues to allow access to the IO resource.

\* \* \* \* \*